United States Patent [19]
Slocum

[11] Patent Number: 5,667,204
[45] Date of Patent: Sep. 16, 1997

[54] SLIT-TUBE REPLICATED IN-PLACE CONSTRAINED LAYER DAMPER AND METHOD

[75] Inventor: Alexander Henry Slocum, Concord, N.H.

[73] Assignee: AESOP, Inc., Concord, N.H.

[21] Appl. No.: 494,943

[22] Filed: Jun. 26, 1995

[51] Int. Cl.$^6$ .................................................. F16F 1/14
[52] U.S. Cl. .................. 267/136; 267/154; 188/322.5; 248/636
[58] Field of Search ............... 188/266, 268, 188/322.5; 267/136, 137, 154; 248/636, 603, 638; 52/729.1, 731.3, 731.7

[56] References Cited

U.S. PATENT DOCUMENTS

| | | | |
|---|---|---|---|
| 3,545,737 | 12/1970 | Lamprey | 267/154 |
| 3,664,202 | 5/1972 | Metzger | 267/154 |
| 3,709,478 | 1/1973 | Kisliug | 267/137 |
| 4,254,847 | 3/1981 | Kamman et al. | 188/322.5 |
| 4,768,761 | 9/1988 | Kramer | 267/154 |
| 5,165,507 | 11/1992 | Ohshima | 188/322.5 |
| 5,203,435 | 4/1993 | Dolgin | 267/154 |

FOREIGN PATENT DOCUMENTS 94005948  3/1994  WIPO ........................... 248/638

*Primary Examiner*—Robert J. Oberleitner
*Assistant Examiner*—Chris Schwartz
*Attorney, Agent, or Firm*—Rines & Rines

[57] ABSTRACT

An economic and efficient method for providing an inner constrained layer damping system to a tubular structure by inserting an inner damping tube that has been substantially slit along its length at several places around its circumference and then wrapped in a viscoelastic tape to cover the slits, or just plain tape to just cover the slits, with a viscoelastic layer thereupon with the tape inserted within and coextensively along the inside of the outer structural beam to be damped, and with the space between the two filled with a replicating material such as epoxy, cement grout, rubber, or other pourable or injectable material, which must have high shear damping properties if the latter tape-just-covering-the-slit option is used, to couple in shear the outer structural beam to the inner slit damping tube and cause shear strains to be transmitted across the viscoelastic boundary between the two tubes.

17 Claims, 4 Drawing Sheets

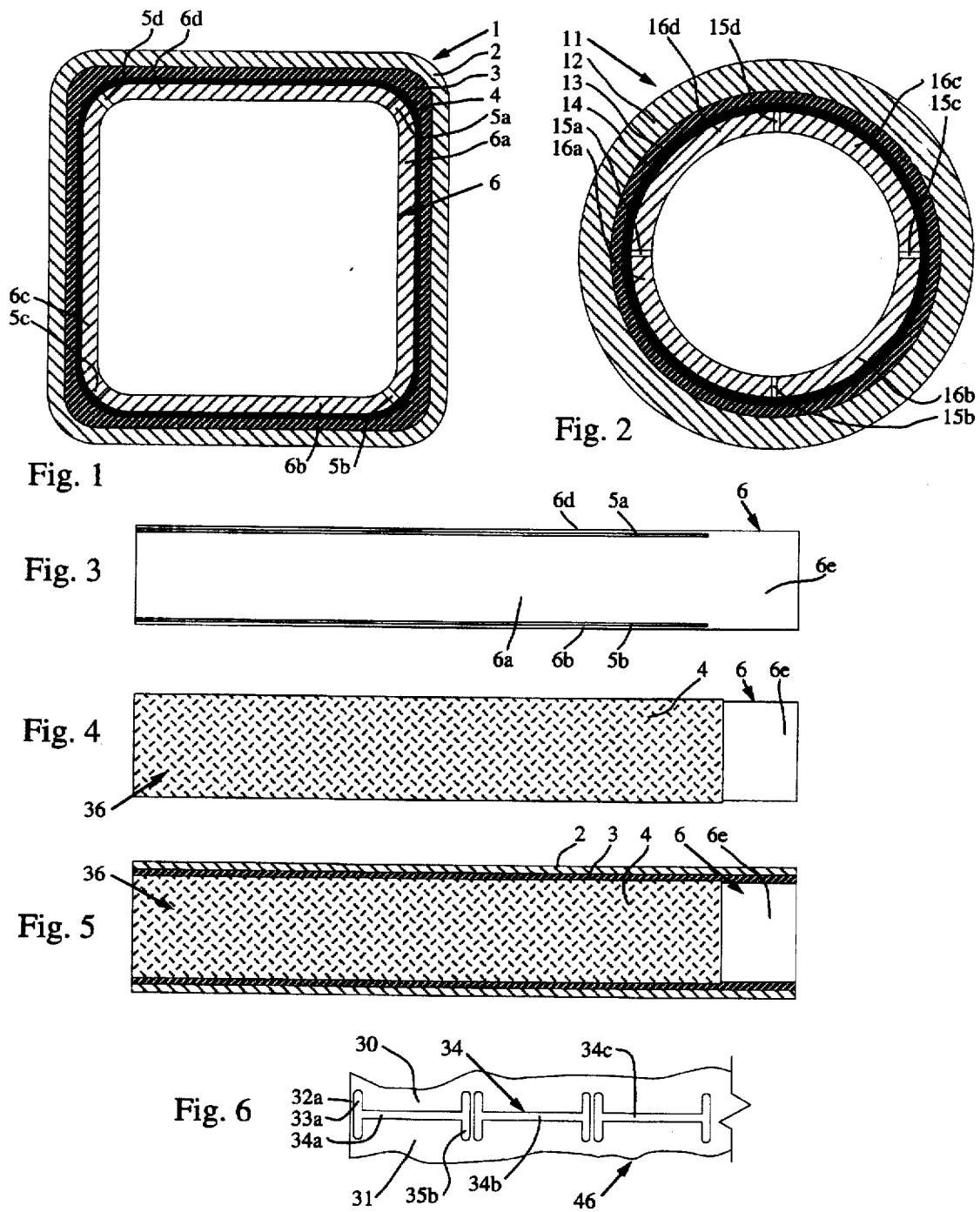

SLIT-TUBE REPLICATED IN-PLACE CONSTRAINED LAYER DAMPER AND METHOD

The present invention relates to means for damping vibrations in hollow beam members, being specifically concerned with damping by the techniques of copending application Ser. No. 406,253 filed Mar. 13, 1995 using one or more inner coextensive damping beams that are viscoelastically coupled to the outer beam by means of either wrapping the inner beam in a viscoelastic tape and then replicating it in place, or by filling the cavity between the two beams with a viscoelastic material layer that is cured in place.

BACKGROUND

There are many types of damping systems, and many constrained layer damping methods amongst them; however, all existing methods have some disadvantages when trying to damp a beam from the inside. As disclosed in the before-mentioned copending application, the process of replication can be used to overcome many of the difficulties associated with placing a damper on the inside of a structure. In some applications, however, wrapping tubes and placing them on the inside of a hollow structure, can introduce a problem in the weight of the material required on the inside of the hollow beam one may wish to damp, and also certain disadvantages in the use of multiple inner damper beams. The present invention is directed to eliminating such weight and multiple inner beam requirements for damping applications concerned with these factors.

OBJECTS OF THE INVENTION

A principal object of the invention is to provide a new and improved replicated in-place internal viscous shear damper for hollow beam machine structures and components and the like of reduced weights and number of required internal damper beam structures, and a novel method underlying the same.

Another object is to provide a means for easily, economically, and effectively damping a beam by constraining a thin viscoelastic layer between a constraining inner coextensive support layer disposed along the inside of a hollow structure, and the inside surface of the structure.

A further object of the invention is to provide a tubular beam as the inner constraining support layer structure, where the tube is substantially slit at several points along its length, or made from individual plates that are laid up against each other to form a tube structure, but the plates are only fastened to each other, if at all, for a short distance at an end.

An additional objective is to provide a means to wrap or coat the inner constraining support layer structure such that it can be inserted into the outer structure, with the gap between the two structures being filled with a replicating epoxy or a high-damping polymer.

Still another object is to provide a flexural bearing pattern that can be cut into the inner tube, as opposed to just a simple slit, that allows the sides of the tube transversely to shear with respect to one another to preserve the mechanism of shear damping to dampen bending vibrations, while transmitting torsional shear stresses greatly to increase the torsional damping capability of the system.

A further object of this invention is to provide damping for long beams which also helps to increase the static stiffness by slitting a damping tube or solid beam along its length while still leaving the ends unslit, so the slit sides function independently to give damping by shear of a viscoelastic layer, but still act in union to increase static stiffness.

SUMMARY

In summary, the invention from one of the viewpoints embraces an apparatus for internally damping a hollow longitudinally extending structural member, the hollow of which is defined by the inner surface of the member, that comprises, a constraining surface inserted within and extending coextensively along the hollow adjacent the inner surface of the structural member, the constraining surface being provided with a plurality of transversely spaced longitudinally extending slits co-extensive with the said inner surface of the structural member, the slit constraining surface being covered by a thin viscoelastic damping layer, and the damping-layer-covered constraining surface being replicated in place adjacent, along, and to the said inner surface of the structural member by an interposed replicating material.

The invention provides an economic and efficient method for providing an inner constrained support layer damping system to a hollow structural member to be damped, by inserting an inner damping tubular beam providing a constraining surface adjacent the inner wall of the outer beam member and that has been substantially slit along its length at several places transversely around its circumference and then either wrapped in a viscoelastic tape to cover the slits, or just plain tape to just cover the slits with a viscoelastic layer thereupon, and with the tube inserted within and co-extensively along the outer structural beam that is to be damped, and with the space between the two filled with a replicating material such as epoxy, cement grout, rubber, or other pourable or injectable material, which must have high shear damping properties if the latter tape-just-covering-the-slit option is used, to couple in shear the outer structural beam to the inner slit damping tube and cause shear strains to be transmitted across the viscoelastic boundary between the two tubes.

Preferred and best mode embodiments are hereinafter described.

DRAWINGS

The invention will now be described with reference to the accompanying drawing in which:

FIG. 1 is a cross-section of a square tubular beam system showing the outer structural hollow tubular beam, the slit inner tubular beam, and the viscoelastic damping tape or layer and the replicating material;

FIG. 2 is a similar cross-section of a round tube system showing the outer structural tubular beam, the slit inner tube, and the viscoelastic damping tape or layer and the replicating material;

Figure 9:
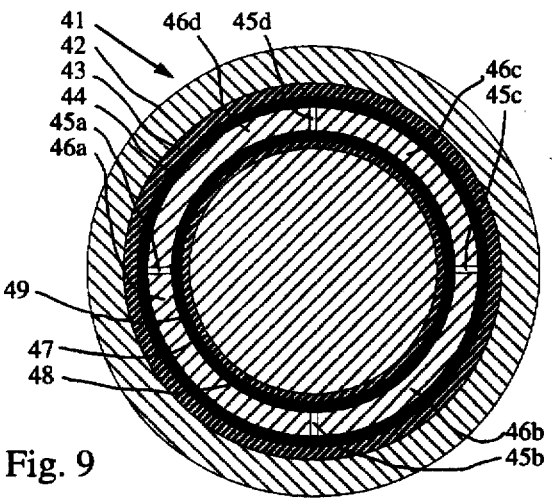
Figure 7:
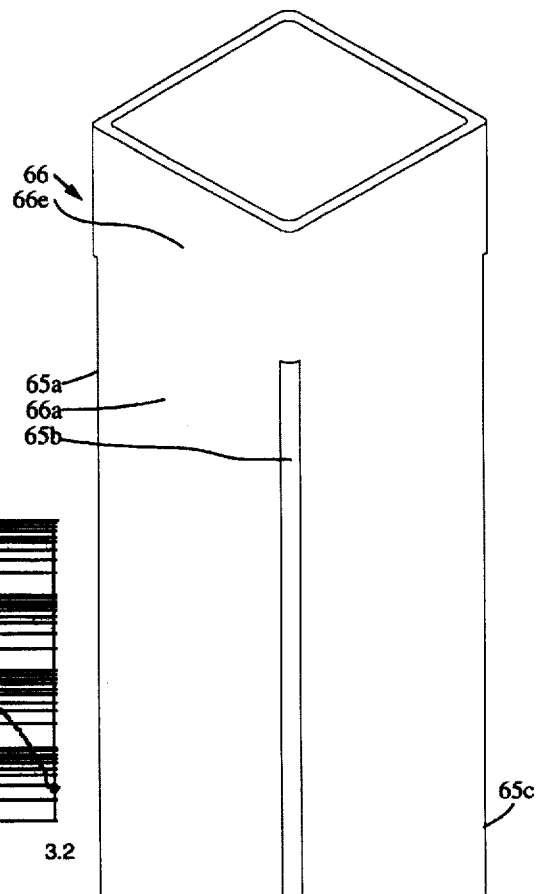
Figure 10:
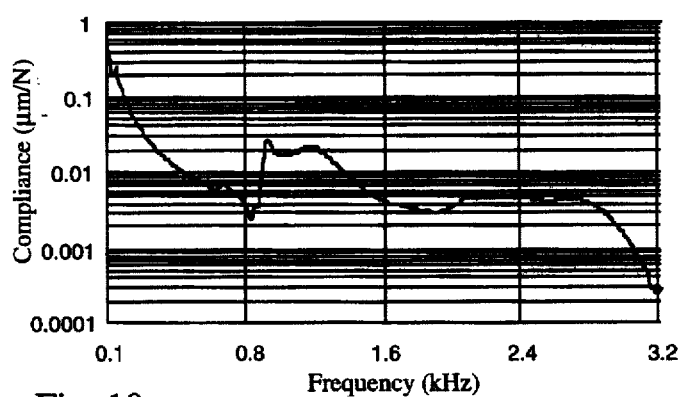
Figure 11:
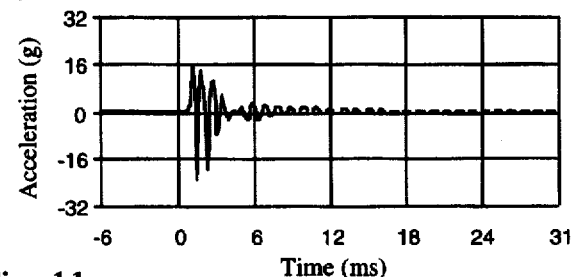
Figure 8:
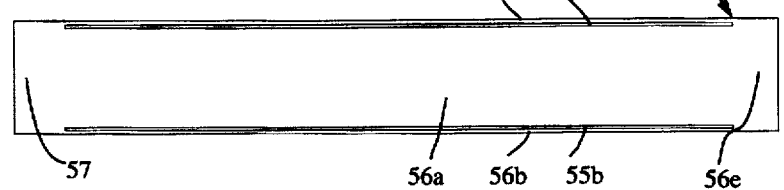
Figure 12:
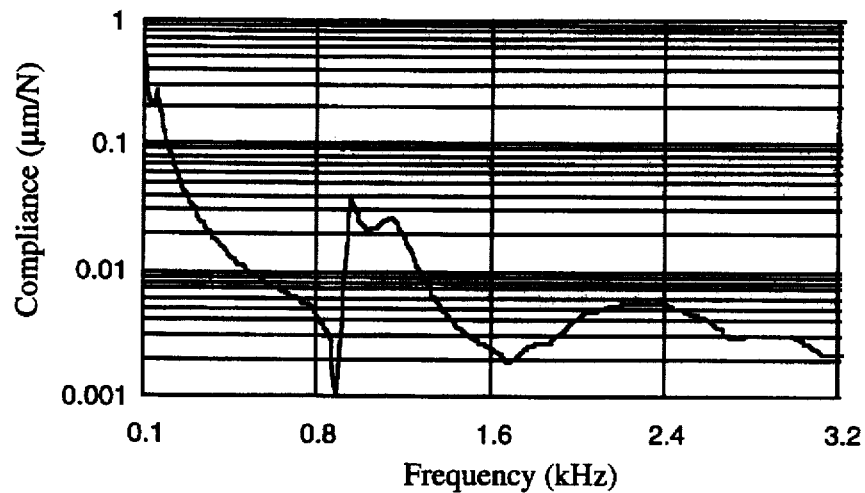
Figure 13:
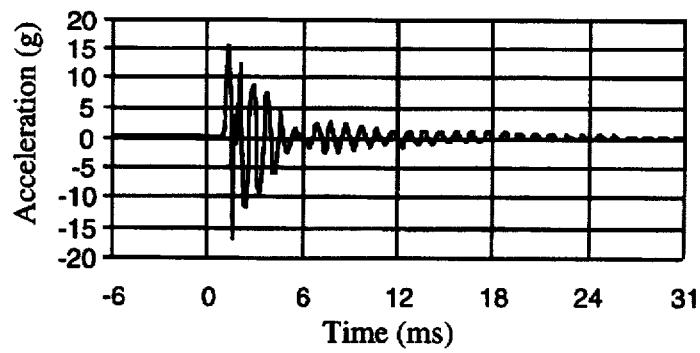
Figure 14:
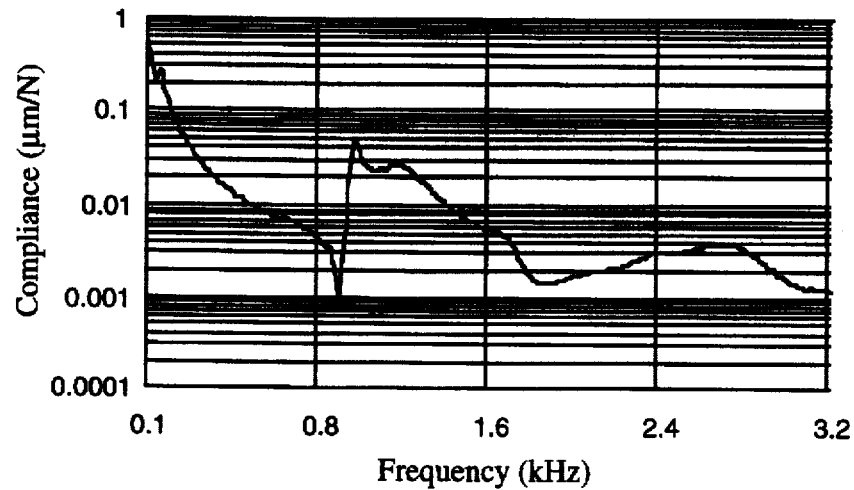
Figure 15:
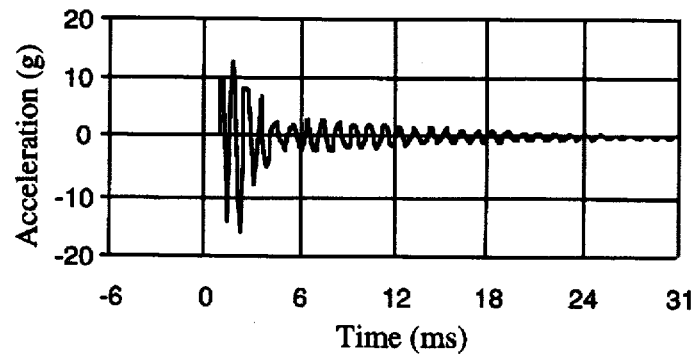
Figure 16:
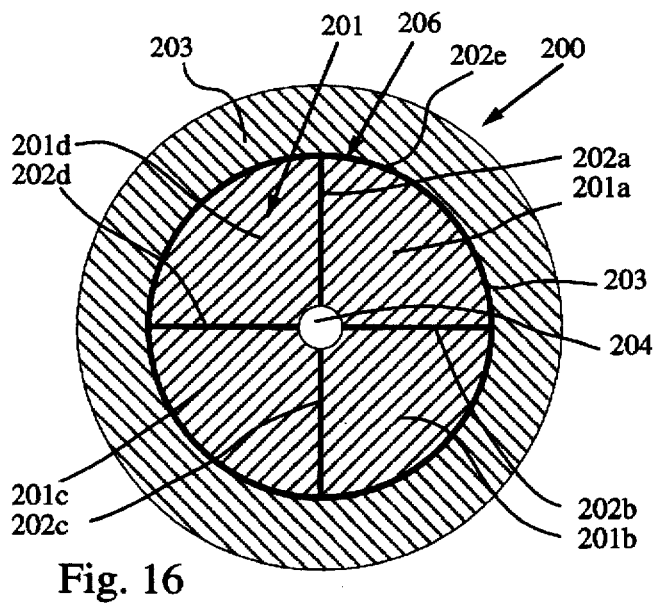
Figure 17:
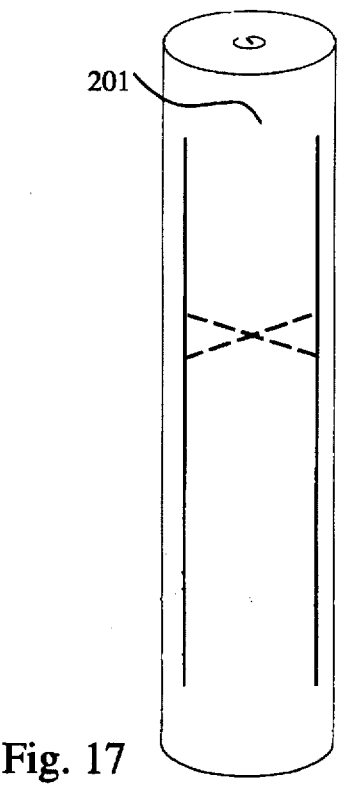

FIG. 3 is a side view of the inner damping tube showing how the slits extend almost all the way along the tube, but not all the way to the end, so that the unslit end holds the slit portions of the tube together and acts as a solid anchoring point for one end of the inner shear tube to the outer structural tube, while the components of the slit portions have their neutral axes located very far from the center of the outer beam;

FIG. 4 is a side view of the inner damping tube showing how the slits are covered by the viscoelastic tape prior to being inserted into the outer structural tube;

FIG. 5 is a cross-sectional side view showing how the wrapped inner tube is coupled to the outer tube by the replicating material, (e.g.,epoxy) so that shear stresses are imposed on the viscoelastic layer as differential motion occurs between the inner and outer structures because the neutral axes of the components are offset from each other, as explained in said copending application and later herein;

FIG. 6 is a partial top view showing the type of structural detail that can be incorporated into the slit design, as opposed to just a single long slit, to prevent a long slit tube from springing open when slit, while still decoupling the neutral axes of the tube sides so they act far away from the center axis of the tube, thus also allowing the inner tube to remain torsionally stiff, which greatly increases the torsional damping capability of the system;

FIG. 7 is an isometric view of a modified inner damping tube with both the attributes of the tube shown in FIG. 3 (long slits) and the end flexure constraint shown in FIG. 6;

FIG. 8 is a side view of the inner damping tube showing how the slits preferably extend almost all the way along the tube, but not all the way to the ends, so that the unslit end holds the slit portions of the tube together and acts as a solid anchoring point for one end of the inner constraining shear tube to the outer structural tube, while the components of the slit portions have their neutral axes very far from the center axis of the outer beam; and for long tubes (L/D>3), with the slits stopping short of both ends of the tube;

FIG. 9 is a cross-sectional view through a beam, such as a boring bar, where it is desired to maximize static and dynamic stiffness, so a damping tube such as shown in FIG. 7 is used;

FIG. 10 is a plot of the compliance of a 5"×5"×30"×¼" wall (125×125×750×6 mm) steel tube that is damped with a slit 4"×4"×30"×¼" (100×100×750×6 mm) wall inner damping tube wrapped with a 1 mm thin layer of Soundcoat® GP3 (Deer Park N.Y.) viscoelastic damping material, and replicated in place with epoxy, where the inner damping tube has the end boundary conditions shown in FIG. 8;

FIG. 11 is a plot of the time response of the system of FIG. 10;

FIG. 12 is a plot of the compliance of a 5"×5"×30"×¼" wall (125×125×750×6 mm) steel tube that is damped with a slit 4"×4"×30"×¼" (100×100×750×6 mm) wall inner damping tube wrapped with a 1 mm thin layer of Soundcoat® GP3 (Deer Park N.Y.) viscoelastic damping material, and replicated in place with epoxy, where the inner damping tube has the end boundary conditions shown in FIG. 7;

FIG. 13 is a plot of the time response of the system of FIG. 12;

FIG. 14 is a plot of the compliance of a 5"×5"×30"¼" wall (125×125×750×6 mm) steel tube that is damped with a slit 4"×4"×30"×¼" (100×100×750×6 mm) wall inner damping tube wrapped with a 1 mm thin layer of Soundcoat® GP3 (Deer Park N.Y.) viscoelastic damping material, and replicated in place with epoxy, where the inner damping tube has the end boundary conditions shown in FIG. 3;

FIG. 15 is a plot of the time response of the system of FIG. 14;

FIG. 16 is a cross-sectional view of still a further modification using a slit internal rod;

FIG. 17 is an isometric view of such a slit rod structure; and

Figure 18:
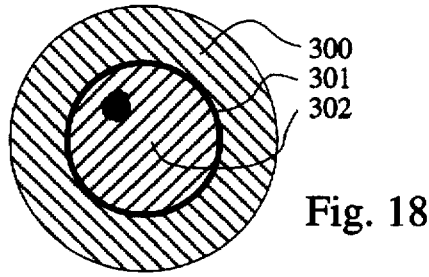
Figure 19:
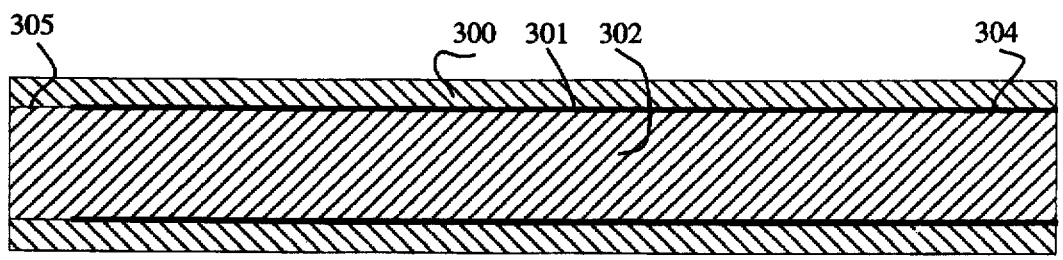

FIGS. 18 and 19 are respectively cross-sectional and longitudinal section views of still a further modified internal rod structure.

DESCRIPTION OF THE INVENTION

The invention provides an economical method for creating constrained layer dampen on the inside of a hollow structural member while minimally impacting the interior cross-section and total weight of the system.

Normally, an inner concentric or coaxial beam would not damp an outer beam because their neutral axes are coincident and thus there is no shear between them when the beams bend. In accordance with present inventions, however, it has been discovered that novel results are attained by slitting the inner beam along its length in several locations so as to form several structures whose neutral axes are well spaced, and which are joined at one end for better anchoring and ease of manufacture, and at the other end are specially joined by flexures to keep the tube from spreading.

In the square tube system 1 of FIG. 1, there is shown the outer structural hollow longitudinally extending tubular beam member 2 that is to be internally damped, and the co-extensive adjacent slit inner rectangular tube 6, with the viscoelastic damping tape or layer 4, layering the tube 6 and with the replicating material 3 securing the inner tube to the inner surface of the outer beam 2. The slit tube 6 has slits 5a, 5b, 5c, 5d that separate the four sides of the inner tube into distinct sections 6a, 6b, 6c, and 6d. For example, the slits can be formed with a plasma torch or other cutting means, or by welding together at descrete locations plates or other sections. The result is that each of these sections has its neutral axis through its centroid which is about as far away as one can get from the center neutral axis of the outer structural tube 2. Thus the amount of shear across the viscoelastic damping tape or layer 4 will be maximized, and hence one will achieve maximum damping per unit weight of damping components placed inside the outer structural tube.

This enables a simple internal structural damping beam or tube to be used of cross-dimensions slightly less than the hollow of the outer beam providing an inner constraining support surface or layer to act, with the intermediate thin viscous layer, to achieve the high degree of damping of the invention and with minimal weight.

FIG. 2 shows the same principle applied to a round tube system 11 showing the outer structural beam 12 to be damped, the closely adjacent circular slit inner tube 16, the viscoelastic damping tape or layer 14, and the replicating material 13. The inner slit tube 16 has slits 15a, 15b, 15c, and 15d that separate the inner tube into distinct sections 16a, 16b, 16c, and 16d. Depending on the size of the system, one may wish to use more sections; but this increases cost. The result is that each of these sections has its neutral axis through its centroid, as far away as possible from the neutral axis of the outer structural tube 12. Thus the amount of shear across the viscoelastic damping tape or layer 14 will be maximized, and hence one will achieve maximum damping per unit weight of damping components placed inside the outer structural beam.

It should be noted that in both cases, one of the labor and material saving aspects of this invention is that after the tube is slit, one merely takes a sheet of damping material and wraps it like a blanket around a single tube. Although this may not be practical for very large structures, because of buckling issues, for modest tubes commonly found in many manufacturing machines, this method is highly effective.

To illustrate the design in greater detail, consider FIG. 3 which shows a side view of the inner damping tube 6 illustrating the slits 5a and 5b extending almost all the way along the tube 6, but not all the way to the end 6e. The unslit end 6e holds together the slit portions of the tube pieces (6d, 6a, and 6b in this view) and acts as a solid anchoring point for one end of the inner shear tube 6 to the outer structural tube 2, FIG. 1, while the slit portion components 6a, 6b, 6c, and 6d have their neutral axes very far from the center axis of the unslit portion of the beam 6.

After the tube is slit, it is preferably wrapped with a viscoelastic damping tape to form an assembly 36, as shown in FIG. 4. The inner damping tube 6, the slits of which are now covered by the viscoelastic tape 4 is inserted into the outer structural tube 2 of FIG. 1. It should be observed that topically at least one end of the tube is left untaped so that it will rigidly bond to the inside of the outer structural tube, and thereby greatly increase the amount of shear that integrates along the length of the inner shear tube 6 as it moves differentially with respect to the outer structural tube 2 when bending or torsional loads are applied.

Once the inner shear tube assembly 36 is replicated into the outer structural tube 2, it is firmly anchored in place as shown in FIG. 5. Here the wrapped inner tube assembly 36 is coupled to the outer tube 2 by the replicating material 3, (e.g., epoxy) so that shear stresses are imposed on the viscoelastic layer 4 as bending- or torsion- induced differential motion, occurring between the inner and outer structures due to the fact that the component neutral axes are offset from one another The method of slitting the inner tube works well for modest length tubes without very high internal stresses. For longer tubes, however, or for tubes that may spring open extensively when they are slit, one can incorporate a series of flexural springs that free the tube side neutral axes so they are substantially decoupled, yet maintain the geometry of the tube and indeed also help to maintain the torsional rigidity of the inner tube which increases the torsional damping effectiveness of the systems. This concept of creating selected flexural hinges along the length of the slit to break it up into slit-segments is illustrated in FIG. 6. FIG. 6 shows a partial view of a portion of an inner shear tube system 46 with two sides of a tube 30 and 31 being substantially separated by the slit 34 and having segments 34a, 34b, 34c etc. Each of these segments is separated from one other by a thin solid segment, such as 32a, which is formed because each slit segment, such as 34a, has transverse grooves as at 33a and 35a at its ends. The result is that the sides 30 and 31 can shear along their length with respect to one other because the segments (such as 32a) have insignificant stiffness in this direction. Such segments, however, are in hoop tension if the sides of the tube try to move radially due to stresses being relieved by the slitting action.

FIG. 7 shows an isometric of a inner damping tube that incorporates the concept of the flexures illustrated in FIG. 6 and the slits shown in FIG. 3. In this tube 66, one end 66e is left un-slit, while slits (shown at 65a, 65b, and 65c in this view) run the length of the tube until they form the cross-slits at their ends which form the flexures. For slit 65b, the cross slit 63a starts at the end. The remaining material 62a at the end of the tube is relatively stiff in a radial direction, to keep sides 60a and 60b coupled together radially so they do not peel apart after slitting.

Present day computer controlled torches or current water-jet cutters can readily be used to create these slit patterns, particularly in materials like square or round steel or aluminum tubes.

There are many different types of flexural hinges that can be made integral with the tube, and these will be obvious to one skilled in the art. Similarly, one does not have to start with a tube and provide it with slits. One can construct plates or channels and put them together into the form of a tube, wrap them, and leave one end unwrapped (ideally, but not absolutely required), and then insert and replicate them into the structure. Furthermore, in some instances, one may wish to not use viscoelastic tape, but instead use a replicating material that is itself properly viscoelastic for the space between the inner and outer tubes. In this case, the slits or the joints between the tube need to be sealed so the viscoelastic material does not flow into the inner cavity (unless it is so desired). This can be accomplished with thin strips of tape over the slits, or by the inflation of a balloon on the inside of the inner tube. In this case, one may want to put a circumferential restraint on the slits (e.g., a few circumferential wraps of strapping tape), to prevent internal pressure forces from the balloon from opening up the inner structure.

For long beams, the sides of the tube that are in effect decoupled from each other by the slits can be held together at both ends, so that overall, they act in unison to increase the static stiffness of the beam; however, along their length, they locally deform relative to the outer tube to create shear damping. Thus, in effect, one can provide damping for long beams which also helps to increase the static stiffness by slitting the inner damping tube along its length while still leaving the ends unslit, so the slit sides function independently to give damping by shear of a viscoelastic layer, but still act in union to increase static stiffness.

The tube to accomplish this is shown in FIG. 8, which illustrates a side view of an inner damping tube 56 showing how the slits, 55a and 55b, extend almost all the way along the tube 56, but not all the way to the end 56e. The unslit end 56e holds the slit portions of the tube pieces 56d, 56a, and 56b together and acts as a solid anchoring point for one end of the inner shear tube 56 to the outer structural tube, such as 2 in FIG. 1. The slit portion components 56a, 56b, 56c, and 56d have their neutral axes located very far from the center axis of the unslit portion of the beam 56. The other end of the tube remains solid so the slit-apart sides remain coupled through end section 57 of the tube.

To illustrate maximum damping and static stiffness in, for example, a boring bar or other long beam application, FIG. 9, shows a round system 41 having an outer structural tube 42, a slit inner tube 46, the viscoelastic damping tape 44 on the outer side of the tube 46 and the damping tape 47 on the inside, and a solid inner bar 48 to add to overall static stiffness and give a second constraining layer against which the damping tape can shear, and then replicating material 43 and 49. The slit tube 46 has slits 45a, 45b, 45c, and 45d that separate the inner tube into distinct sections 46a, 46b, 46c, and 46d. Depending on the size of the system, one may wish to use more sections, but this increases cost. The result is that each of these sections has its neutral axis through its centroid which again is remote from the neutral axis of the outer structural tube 42.

In order to illustrate the practical effectiveness of the various methods, consider FIGS. 10–15 which present actual successful experimental results.

First consider the case where the inner damping tube is slit along its length, but where the slits stop short at the very ends, where the tube remains unslit, as shown in FIG. 8. FIG. 10 is a plot of the compliance verses frequency of a 5"×5"×30"×¼" (125×125×750×6 mm) wall steel tube that is damped with a slit 4"×4"×30"×¼" (100×100×750×6 mm) wall inner damping tube wrapped with a 1 mm layer of Soundcoat® GP3 (Deer Park N.Y.) viscoelastic damping material, and replicated in place with epoxy. Note the very broad dynamic peaks which indicate a high degree of damping. In this case, the minimum stiffness of the system, which occurs at dynamic resonance, is 38.3N/μm. FIG. 11 shows a plot of the time response of the this system which illustrates how rapidly an impulse dies out. This illustrates a very high degree of damping.

Next, consider the case where the inner damping tube is slit along its length, but at one end the tube is left unslit, and at the other end the tube is cross-slit to form flexures as shown in FIG. 7. FIG. 12 is a plot of the compliance of a 5"×5"×30"×¼" (125×125×750×6 mm) wall steel tube that is damped with a slit 4"×4"×30"×¼" (100×100×750×6 mm) wall inner damping tube wrapped with a 1 mm layer of Soundcoat® GP3 (Deer Park N.Y.) viscoelastic damping material, and replicated in place with epoxy. In this case, the minimum stiffness of the system, which occurs at dynamic resonance, is 27.1N/μm. FIG. 13 is a plot of the time response of the system, which shows that the damping is still good, but not as good as the system of FIG. 11.

Next consider the case where the inner damping tube is slit along its length, but at one end the tube is left unslit, and at the other end the tube is slit all the way to the end as shown in FIG. 3. FIG. 14 is a plot of the compliance of a 5"×5"×30"×¼" (125×125×750×6 mm) wall steel tube that is damped with a slit 4"×4"×30"×¼" (100×100×750×6 mm) wall inner damping tube wrapped with a 1 mm layer of Soundcoat® GP3 (Deer Park N.Y.) viscoelastic damping material, and replicated in place with epoxy. In this case, the minimum stiffness of the system, which occurs at dynamic resonance, is 20.3N/μm. FIG. 15 is a plot of the time response of the system of FIG. 14., which again shows reasonable damping, equal to that of the system in FIG. 13, but not as good as that shown in FIG. 11.

The data shows that the flexures are doing their job at uncoupling the sides of the tube from one another, so the systems behave as would be predicted by the methods described in said copending application. The slitting of the tubes all the way to the end is a new and novel method for attaining damping with a lower manufacturing cost and lower weight than realized by the use of multiple tubes. The flexure design would be used when the tubes are long (L/D >3) to prevent the sides of the tube curling open like a flower when the tube is cut. For longer tubes, or where one wants to drill through the side of the tube at a later time, the ends of the tubes should be left plain, as shown in FIG. 8, to maximize the system's dynamic stiffness.

Indeed, by leaving the inner damping tube's ends unslit, one retains a great deal of the tube stiffness, which helps to increase the static and dynamic stiffness of the structure, as the above data shows. This greatly increases the performance of space-limited structures, such as boring bars.

FIG. 16 shows the cross-section of a tool where it is desired to maximize the stiffness in a small space. This is an ideal application for the invention. In this case, the main structure 203 of a tool 200 has a center hole 206. This center hole 206 is where the damping device must be placed. Putting a hole in the device, however, reduces the stiffness. On the other hand, the bigger the hole is, the better the damping. The tradeoff is a decrease in static stiffness for an increase in dynamic stiffness. A rod 201 is shown employed, which may have a center hole 204, into which a funnel and then a solid form of viscoelastic material may be placed and then heated to flow into the thin gaps. The invention here, however, gives damping while maintaining considerable static stiffness. Thus much greater overall stiffness is obtained. In this design, FIG. 16 and 17, the center hole 206 has the inserted rod structure 201, where the round hole is typically a few tenths of a millimeter larger than the rod 201. Secondly, as also shown in FIG. 16, the rod 201 has thin slits cut through it, shown filled with viscoelastomer at 202a, 202b, 202c, extending almost all the way along its length (but not quite all the way, within ¼–1 diameters). By not slitting the rod all the way, it maintains a reasonable static bending stiffness, while allowing for substantial torsional and bending shear between the rod 206 and the inner hole surface 206 of the outer structure 203. To dissipate energy, the small annular gap and the slits are filled with a very viscous fluid 202a, 202b, 202c, 202d, and 202e, or a viscoelastic material (either of which can be applied using heat to reduce the viscosity of the materials so that they flow into the gaps).

As for the best end conditions to use for anchoring the inner rod 201 to the outer structure 206, the theory is quite complex, and subject to some degree of empirical verification; thus tests are best conducted. Typically, one end of the rod 201 is anchored (welded, epoxied, threaded) to the structure 203, and the other end is left free (only coupled to the outer structure by the viscous or viscoelastic material).

Special consideration is required, furthermore, where long shafts are involved that introduce torsional vibration problems. If the center structure is not slit at all, then it will still create shear stresses at the interface between it and the outside tube. In addition, in order to maximize the torsional stiffness of the system, both ends of the inner structure may be fixed to the outer structure. This is illustrated in FIGS. 18 and 19, where the outer structure 300 has an inner structure 302 extending within it, with a viscous or viscoelastic material 301 interphased, and in which optimizing of the relative stiffnesses and effective viscosities may be determined as disclosed in said copending application. As shown in FIG. 19, however, one end 305 of the inner structure 302 is rigidly attached to the shaft at its end. After about one diameter, there is shown a gap between the structures 300 and 302 that is filled with a viscous or viscoelastic material. In most cases, the filled gap runs all the way to the end of the structures. In some cases, such as where the torque is transmitted partway along the shaft, as in a screw, it can be desirable from a maximum stiffness perspective, to fix both ends and only fill the gap in the middle.

The overall end result of this invention is that the user takes a simple tube, cuts slits in it, wraps it in a blanket of viscoelastic tape, inserts it into the structure, and injects or pours epoxy replicant; or places a tube which may or may not be slit, into a narrowly confined space, and then flows in (e.g. by heating) a viscous or viscoelastic material. The process is simple and elegant, based on integrating structural theory with state-of-the-art manufacturing techniques to produce an economical and highly effective structure.

Further modifications of the invention will also occur to persons skilled in the art, and all such are deemed to fall within the spirit and scope of the invention as defined by the appended claims.

What is claimed is:

1. An apparatus for internally damping a hollow longitudinally extending structural member, the hollow of which is defined by the inner surface of the member, that comprises, a separate constraining surface inserted within and extending co-extensively adjacent the inner surface of the structural member, the constraining surface being provided with a plurality of transversely spaced longitudinally extending slits co-extensive with said inner surface of the structural member, the slit constraining surface being covered by a thin viscoelastic damping layer, and the damping-layer-covered constraining surface being replicated in place adjacent, along, and to said inner surface of the structural member by an interposed replicating material, and in which the constraining surface is the outer surface of a tubular member of similar cross-sectional shape to that of the structural member and with the tubular member of slightly less cross-dimension than the hollow of the structural member, and in which the slits extend along the tubular member but stop short of both ends of the tubular member, one end of the tubular member remaining unslit and the other provided with cross slits to form flexures.

2. An apparatus for internally damping a hollow longitudinally extending structural member, the hollow of which is defined by the inner surface of the member, that comprises, a separate constraining surface inserted within and extending co-extensively adjacent the inner surface of the structural member, the constraining surface being provided with a plurality of transversely spaced longitudinally extending slits co-extensive with said inner surface of the structural member, the slit constraining surface being covered by a thin viscoelastic damping layer, and the damping-layer-covered constraining surface being replicated in place adjacent, along, and to said inner surface of the structural member by an interposed replicating material, and in which the constraining surface is the outer surface of a tubular member of similar cross-sectional shape to that of the structural member and with the tubular member of slightly less cross-dimension than the hollow of the structural member, and in which the slits are formed by a plurality of slit segments, and the slit segments are terminated in cross slits forming flexures.

3. An apparatus for internally damping a hollow longitudinally extending structural member, the hollow of which is defined by the inner surface of the member, that comprises, a separate constraining surface inserted within and extending co-extensively adjacent the inner surface of the structural member, the constraining surface being provided with a plurality of transversely spaced longitudinally extending slits co-extensive with said inner surface of the structural member, the slit constraining surface being covered by a thin viscoelastic damping layer, and the damping-layer-covered constraining surface being replicated in place adjacent, along, and to said inner surface of the structural member by an interposed replicating material, and in which the constraining surface is the outer surface of a tubular member of similar cross-sectional shape to that of the structural member and with the tubular member of slightly less cross-dimension than the hollow of the structural member, and in which a solid rod is inserted within the tubular member, and the inner surface of the slit tubular member is covered by a further viscoelastic layer and replicated to the solid rod.

4. An apparatus as claimed in claim 3 and in which the solid rod is also longitudinally slit.

5. An apparatus as claimed in claim 3 and in which gaps in the slits are filled with one of viscous and viscoelastic material.

6. An apparatus as claimed in claim 3 and in which the structural member is one of a tool and a boring bar.

7. An apparatus for internally damping a hollow longitudinally extending structural member, the hollow of which is defined by the inner surface of the member, that comprises, a separate constraining surface inserted within and extending co-extensively adjacent the inner surface of the structural member, the constraining surface being provided with a plurality of transversely spaced longitudinally extending slits co-extensive with said inner surface of the structural member, the slit constraining surface being covered by a thin viscoelastic damping layer, and the damping-layer-covered constraining surface being replicated in place adjacent, along, and to said inner surface of the structural member by an interposed replicating material, and in which the constraining surface is the outer surface of a tubular member of similar cross-sectional shape to that of the structural member and with the tubular member of slightly less cross-dimension than the hollow of the structural member, and in which the slits extend along the tubular member but at one or more predetermined regions are cross-slit to form flexures.

8. An apparatus as claimed in claim 7 and in which the slits extend along the tubular member but stop short of one end of the tubular member which remains unslit.

9. An apparatus as claimed in claim 7 in which the slits extend along the tubular member but stop short of both ends of the tubular member which remain unslit.

10. An apparatus as claimed in claim 7 and in which the slits are formed by a plurality of slit segments.

11. An apparatus as claimed in claim 7 and in which a solid rod is inserted within the tubular member.

12. A method of achieving improved internal damping of a hollow longitudinally extending structural member the hollow of which is defined by its inner surface of predetermined cross-sectional shape and cross-dimensions, the method comprising, forming a longitudinally extending tubular member of cross-sectional shape corresponding to that of the hollow and of cross-dimensions slightly less than that of the hollow and of a length substantially the same as that of the hollow; providing a plurality of longitudinally extending transversely spaced slits in such tubular member coextensively along the tubular member; covering the slit tubular member with a viscoelastic damping layer; inserting the slit damping-layer-covered tubular member within and along the hollow of the structural, member; and replicating the tubular member in place adjacent, along and to said inner surface of the structural member by interposing replicating material therebetween, and in which at one or more predetermined regions, the slits are cross-slit to form flexures.

13. The method as claimed in claim 12 and in which the damping layer covering is effected by wrapping the slit tubular member with damping tape.

14. The method as claimed in claim 12 and in which the slits are provided along the tubular member but stopping short of one or both ends thereof which remain unslit.

15. The method as claimed in claim 12 and in which one of said predetermined regions is at one end of the tubular member.

16. The method as claimed in claim 12 and in which at least one of said predetermined regions is a region intermediate the ends of the tubular member.

17. The method as claimed in claim 12 and in which a tool rod is inserted within the tubular member.

* * * * *